United States Patent [19]

Goto

[11] Patent Number: 4,814,617

[45] Date of Patent: Mar. 21, 1989

[54] RADIATION IMAGE READ-OUT APPARATUS

[75] Inventor: Chiaki Goto, Kanagawa, Japan

[73] Assignee: Fuji Photo Film Co., Ltd., Kanagawa, Japan

[21] Appl. No.: 786,553

[22] Filed: Oct. 11, 1985

[30] Foreign Application Priority Data

Oct. 11, 1984 [JP] Japan ............................. 59-212938

[51] Int. Cl.[4] ................................... G01N 23/04
[52] U.S. Cl. .......................... 250/327.2; 250/484.1
[58] Field of Search ...................... 250/327.2, 484.1

[56] References Cited

U.S. PATENT DOCUMENTS 4,582,988  4/1986  Aagano ........................... 250/327.2
4,591,714  5/1986  Goto et al. ...................... 250/327.2
4,691,232  9/1987  Lange ................................ 358/111

*Primary Examiner*—Carolyn E. Fields
*Assistant Examiner*—Richard Hanig
*Attorney, Agent, or Firm*—Sughrue, Mion, Zinn, Macpeak & Seas

[57] ABSTRACT

A radiation image read-out apparatus comprises two or more photodetectors positioned side by side along a scanning line for detecting light emitted by a stimulable phosphor sheet carrying a radiation image stored therein when it is exposed to stimulating rays. Turning on and off of the photodetectors is controlled in accordance with the movement of a scanning point so that at least the photodetector farthest from the scanning point at any given instant is turned off, and at least the photodetector nearest the scanning point is turned on.

3 Claims, 4 Drawing Sheets

RADIATION IMAGE READ-OUT APPARATUS

BACKGROUND OF THE INVENTION

1. Field of the Invention

This invention relates to a radiation image read-out apparatus for a radiation image recording and reproducing system wherein a stimulable phosphor sheet is used.

2. Description of the Prior Art

When certain kinds of phosphors are exposed to a radiation such as X-rays, $\alpha$-rays, $\beta$-rays, $\gamma$-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object to have a radiation image stored therein, and is then scanned with stimulating pattern of the stored image. The light emitted by the stimulable phosphor sheet upon stimulation thereof is photoelectrically detected and converted to an electric image signal, which is processed as desired to reproduce a visible image on a recording medium such as a photo sensitive material or on a display device such as a cathode ray tube (CRT).

FIG. 6 is a perspective view showing the conventional read-out apparatus used in the aforesaid radiation image recording and reproducing system for scanning a stimulable phosphor sheet carrying a radiation image stored therein by stimulating rays such as a laser beam which cause the sheet to emit light in proportion to the stored radiation energy, and photoelectrically detecting the emitted light.

In the apparatus of FIG. 6, stimulating rays 2 are emitted by a stimulating ray source 1, and the beam diameter of the stimulating rays 2 is strictly adjusted by a beam expander 3. The stimulating rays 2 are then deflected by a light deflector 4 formed of a galvanometer mirror or the like, and are made to impinge upon the stimulable phosphor sheet 10 by a plane reflection mirror 5. Between the light deflector 4 and the plane reflection mirror 5 is positioned an $f\theta$ lens 6 for maintaining the beam diameter of the stimulating rays 2 uniform during the constant-speed scanning of the stimulating rays 2 on the stimulable phosphor sheet 10 in the main scanning direction as indicated by the arrow A. While the stimulating rays 2 impinge upon the stimulable phosphor sheet 10, the sheet 10 is moved in the direction as indicated by the arrow B (i.e. sub-scanning direction) and, consequently, the whole area of the sheet 10 is exposed to and scanned by the stimulating rays 2. Upon exposure to the stimulating rays 2, the stimulable phosphor sheet 10 emits light in proportion to the radiation energy stored therein, and the light emitted enters a light guide member 8. The light guide member 8 has a linear light input face 8a positioned close to a scanning line 2a on the stimulable phosphor sheet 10, and a ring-shaped light output face 8b in close contact with the light receiving face of a photodetector 9, which may be a photomultiplier. The light guide member 8 and the photodetector 9 constitute a photoelectric read-out means 7. The light guide member 8 is fabricated of a transparent thermoplastic resin sheet such as an acrylic resin sheet so that the light entering from the light input face 8a can be transmitted to the light output face 8b by total reflection inside of the light guide member 8. The light emitted by the stimulable phosphor sheet 10 upon stimulation thereof is guided inside of the light guide member 8, emitted from the light output face 8b of the light guide member 8 and received by the photodetector 9. The light guide member 8 may be of a shape and a material as disclosed in U.S. Pat. No. 4,346,295.

The light detected by the photodetector 9 is converted thereby into an electric signal, and the output signal of the photodetector 9 is amplified, A/D converted and subjected to a signal processing. Thereafter, the electric signal is used for reproducing a visible image on a recording material such as a photographic film or on a display device such as a CRT.

However, when the time interval between radiation image recording on a stimulable phosphor sheet and image read-out therefrom is short in the aforesaid conventional radiation image read-out apparatus, not only the light emitted by the stimulable phosphor sheet in proportion to the stored radiation energy when the sheet is exposed to stimulating rays but also a instantaneous light emission after-glow (noise) are detected by the photodetector. Therefore, the radiation image is not detected accurately, and the contrast of the reproduced visible image becomes low. By "instantaneous light emission after-glow" is meant the after-glow of light instantaneously emitted by the stimulable phosphor when it is exposed to radiation for image recording. The instantaneous light emission after-glow continues to be emitted by the whole exposed surface of the stimulable phosphor sheet 10 for a fixed time after it is exposed to radiation.

Specifically, in the aforesaid conventional radiation image read-out apparatus, the light input face 8a of the light guide member 8 is positioned facing the scanning line 2a over the whole width of the stimulable phosphor sheet 10 in the main scanning direction, and all light entering the light guide member 8 from its light input face 8a is detected by the photodetector 9. Therefore, the instantaneous light emission after-glow emitted by the whole width region of the stimulable phosphor sheet 10 standing face to face with the light input face 8a is detected by the photodetector 9, and the aforesaid problems are caused by the detected instantaneous light emission after-glow.

In the following description, detection of the light emitted by the stimulable phosphor sheet in proportion to the stored radiation energy when it is scanned by stimulating rays is often referred to as read-out from the stimulable phosphor sheet.

SUMMARY OF THE INVENTION

The primary object of the present invention is to provide a radiation image read-out apparatus wherein the amount of instantaneous light emission after-glow detected together with the light emitted by a stimulable phosphor sheet in proportion to the stored radiation energy during the read-out from the stimulable phosphor sheet is minimized.

Another object of the present invention is to provide a radiation image read-out apparatus which generates a noise-free image signal usable for reproducing a visible radiation image.

The present invention provides a radiation image read-out apparatus provided with a stimulating ray source for emitting stimulating rays, a light deflection means for scanning a stimulable phosphor sheet carrying a radiation image stored therein by said stimulating rays which cause said stimulable phosphor sheet to emit light in proportion to the stored radiation energy, and a photoelectric read-out means for detecting the emitted light, wherein the improvement comprises the provision of:

(i) two or more photodetectors constituting said photoelectric read-out means and positioned side by side along the scanning line, and (ii) a control means for controlling the turning on and off of said photodetectors in accordance with the movement of a scanning point so that at least the photodetector farthest from the scanning point at any given instant is turned off, and at least the photodetector nearest the scanning point is turned on.

In the radiation image read-out apparatus of the present invention, the photoelectric read-out means is constituted by two or more photodetectors, and turning on and off of the photodetectors is controlled in accordance with the movement of the scanning point so that the photodetector or photodetectors which are positioned within a predetermined range in the vicinity of the scanning point (i.e. a read-out picture element exposed to the stimulating rays) and which substantially detect the light emitted by the scanning point at a given instant are turned on, and the photodetector or photodetectors which are positioned far away from the scanning point and which do not detect or little detect the light emitted by the stimulable phosphor sheet in proportion to the stored radiation energy are turned off.

Accordingly, in the radiation image read-out apparatus of the present invention, it is possible to detect all or almost all of the light emitted by the scanning point in proportion to the stored radiation energy, and to eliminate detection of the instantaneous light emission afterglow by the photodetector or photodetectors which are positioned far away from the scanning point and which do not detect or little detect the light emitted by the scanning point in proportion to the stored radiation energy. Therefore, it becomes possible to minimize the amount of the instantaneous light emission after-glow detected, and to obtain an image signal free from noise.

DESCRIPTION OF THE PREFERRED EMBODIMENTS

The present invention will hereinbelow be described in further detail with reference to the accompanying drawings.

The radiation image read-out apparatus in accordance with the present invention is of the type wherein the photoelectric read-out means comprises three or more photodetectors positioned side by side in the scanning line direction. The apparatus of this type will first be described with reference to FIG. 2.

Figure 2:
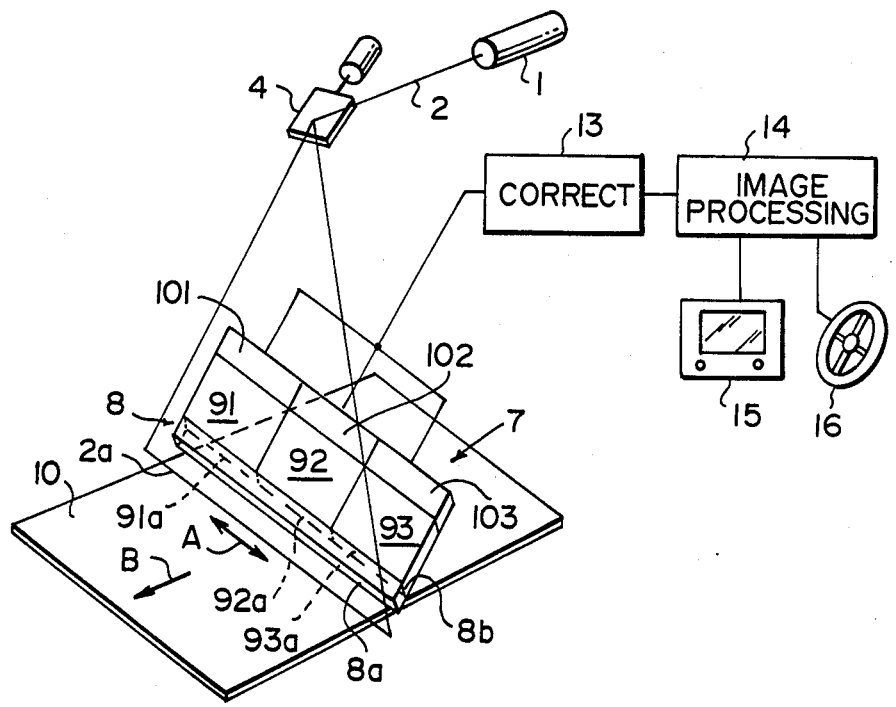
FIG. 2 is a schematic view showing an example of the radiation image read-out apparatus provided with a plurality of photodetectors on which the radiation image read-out apparatus of the present invention is based.

FIG. 2 shows an example of the apparatus of the aforesaid type which is described in Japanese Patent Application No. 58(1983)-227543. The apparatus aims at eliminating the following drawbacks of the conventional apparatus shown in FIG. 6: (1) when light detection is conduced by use of the light guide member 8 and the photodetector 9, since the light guide member 8 is partially rounded cylindrically, the length from the light input face 8a to the light output face 8b of the light guide member 8 becomes large, and therefore the photoelectric read-out means 7 becomes large, (2) since the distance between the light input face 8a and the photodetector 9 is different among various portions of the light guide member 8, the degree of light loss becomes different among various portions of the light guide member 8, and nonuniformity of sensitivity arises, and (3) the light guide member 8 having the complicated shape described above is difficult to fabricate.

Figure 6:
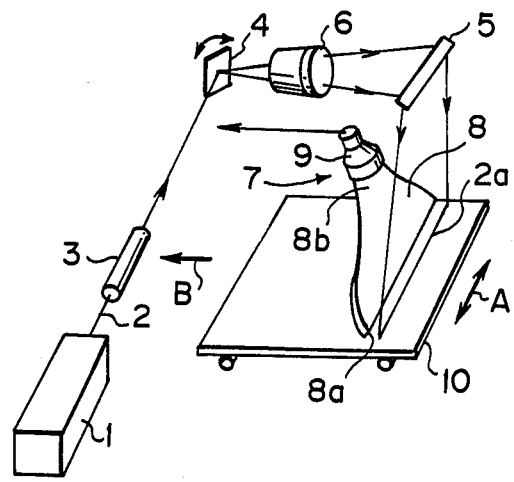
FIG. 6 is a schematic view showing the conventional radiation image read-out apparatus.

In FIG. 2, similar elements are numbered with the same reference numerals with respect to FIG. 6. A photoelectric read-out means 7 comprises an elongated plate-shaped light guide member 8 longer than the width of the stimulable phosphor sheet 10, a plurality of (by way of example, three) photodetectors, for example, photomultipliers 91, 92 and 93, closely contacted with the light guide member 8, and pre-amplifiers 101, 102 and 103 connected to the photomultipliers 91, 92 and 93. The light guide member 8 is fabricated of a material exhibiting a high light transmittance, such as an acrylic resin. A front end face (end face at one long side) of the light guide member 8 standing face to face with the stimulable phosphor sheet 10 is formed as a light input face 8a, and a rear end face (end face at the other long side) of the light guide member 8 is formed as a light output face 8b. The photomultipliers 91, 92 and 93 generate electric signals in accordance with the intensities of light entering from light receiving faces 91a, 92a and 93a thereof. The photomultipliers 91, 92 and 93 are closely contacted with each other, and the light receiving faces 91a, 92a and 93a are closely contacted with the light output face 8b of the light guide member 8 by adhesion or the like. That is, the whole length of the light output face 8b is covered by the light receiving faces 91a, 92a and 93a.

Outputs of the pre-amplifiers 101, 102 and 103 for amplifying the electric signals generated by the photomultipliers 91, 92 and 93 are sent to an image processing circuit 14 via a correction circuit 13, and the electric signals processed by the circuit 14 are used to reproduce a visible image on a CRT 15 or stored in a magnetic tape 16.

When the photomultipliers 91, 92 and 93 are positioned side by side as described above, since dead zones are present at end portions of the photomultipliers 91, 92 and 93, deterioration in sensitivity arises at the contact portions between the photomultipliers 91 and 92 and between the photomultipliers 92 and 93. The correction circuit 13 is provided for eliminating the deterioration in sensitivity.

The correction circuit 13 will hereinbelow be described in detail with reference to FIG. 3. When the stimulable phosphor sheet 10 carrying a radiation image stored therein is exposed to the laser beam 2 as stimulating rays, the sheet 10 emits light 17 having an intensity proportional to the radiation energy stored therein The light 17 emitted by the stimulable phosphor sheet 10 enters the light guide member 8 from the light input face 8a, and is guided inside of the light guide member 8 to the photomultipliers 91, 92 and 93. Outputs of the photomultipliers 91, 92 and 93 amplified by the pre-amplifiers 101, 102 and 103 are added in an adder 30.

The output of the photomultiplier 91 and the output of the photomultiplier 92 are compared with each other by a comparator 31, and the output of the photomultiplier 92 and the output of the photomultiplier 93 are compared with each other by a comparator 32. As shown in FIG. 3, when the laser beam 2 impinges upon the stimulable phosphor sheet 10 on the photomultiplier 91 side with respect to a boundary P1 between the photomultipliers 91 and 92, the amount of the light 17 entering the photomultiplier 91 is larger than the amount of the light 17 entering the photomultiplier 92. At this time, the output of the comparator 31 is at a high level. When the laser beam 17 is scanned in the direction as indicated by the arrow C and passes across the boundary P1, the amount of the light 17 entering the photomultiplier 92 becomes larger than the amount of the light 17 entering the photomultiplier 91, and the output of the comparator 31 goes to a low level. The same thing arises with the comparator 32 before and after the laser beam 17 passes across a boundary P2 between the photomultipliers 92 and 93. That is, waveforms of signals 33 and 34 of the comparators 31 and 32 become as shown by graphs (a) and (b) in FIG. 3.

Figure 3:
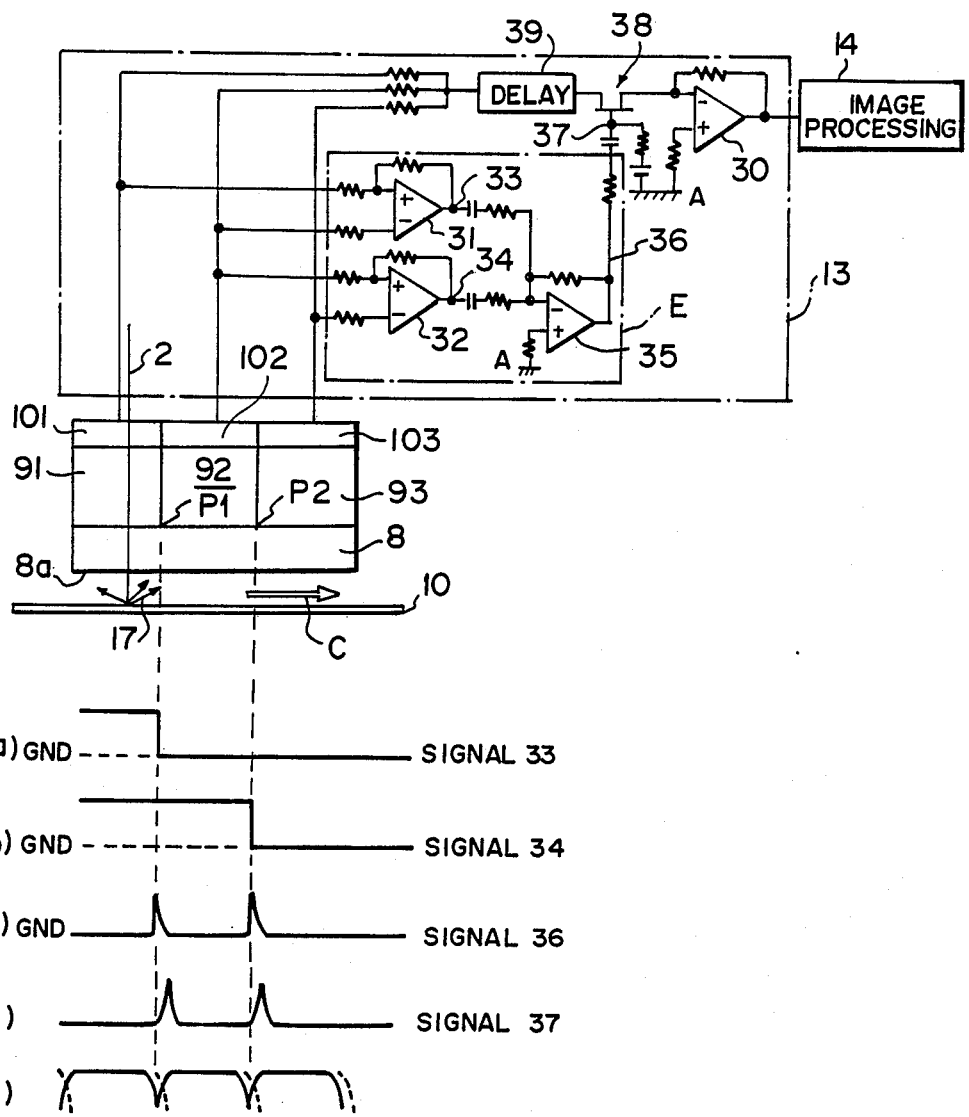
FIGS. 3 and 4 are circuit diagrams showing examples of the circuit configuration of the correction circuit in the apparatus of FIG. 2.

When the outputs of the comparators 31 and 32 are differentiated and then added by an adder 35, an output signal 36 as shown by a curve (c) in FIG. 3 is obtained as a composite differentiated signal. A signal as shown by a curve (d) in FIG. 3 is obtained by integration of the output signal 36, and the alternating current component of the signal 37 is sent to the gate of a field effect transistor (FET) 38. The gate of the FET 38 is normally biased by a direct current and maintained at a predetermined resistance. When the alternating current component of the signal 37 is sent to the gate, the resistance across the source and the drain of the FET 38 becomes low and, as a result, the degree of amplification of the adder 30 is increased. As described above, at the boundary P1 between the photomultipliers 91 and 92 and at the boundary P2 between the photomultipliers 92 and 93, the sensitivity of the detection system is deteriorated as indicated by the full line curve (e) in FIG. 3. The deterioration in sensitivity is electrically eliminated by increasing the degrees of amplification of the pre-amplifiers 101, 102 and 103 at the boundaries P1 and P2 as described above. A delay circuit 39 is positioned between the FET 38 and the pre-amplifiers 101, 102 and 103, and the outputs of the pre-amplifiers 101, 102 and 103 are delayed so that, as indicated by the broken-line curve (e) in FIG. 3, the FET gate signal 37 reaches its peak when the photomultiplier sensitivity becomes minimum.

By way of example, the light guide member 8 is fabricated to have a height within the range of approximately 20 mm to approximately 30 mm. The photomultipliers 91, 92 and 93 are fabricated to have a combined width of approximately 75 mm and a thickness of approximately 20 mm.

Figure 4:
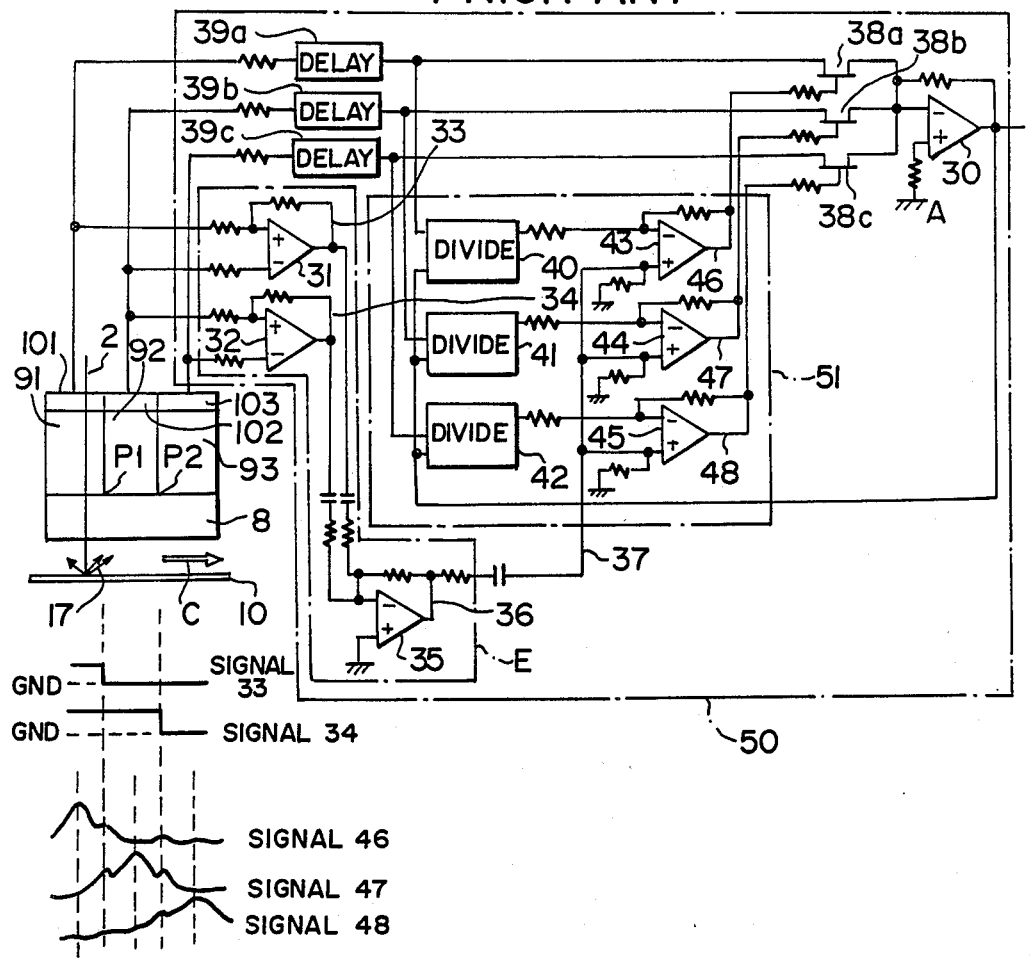

In the aforesaid embodiment, the degrees of amplification of the photomultipliers 91, 92 and 93 are equal to each other. However, by changing the degrees of amplification of a plurality of photomultipliers in accordance with the position of exposure of the stimulable phosphor sheet 10 to stimulating rays, it is possible to improve the S/N ratio. FIG. 4 shows a correction circuit 50 constructed for this purpose. In FIG. 4, similar elements are numbered with the same reference numerals with respect to FIG. 3, and the section indicated by a reference character E is the same as the section indicated by the reference character E in FIG. 3. For example, when the stimulable phosphor sheet 10 is exposed to the laser beam 2 at a position standing face to face with the photomultiplier 91, the solid angles of the light receiving faces of the photomultipliers 91, 92 and 93 covering the light emission point of the sheet 10 decrease in the order of the photomultiplier 91, the photomultiplier 92, and the photomultiplier 93. Therefore, in this case, when the degree of amplification of the output signal of the photomultiplier 91 is maintained larger than that of the output signal of the photomultiplier 92 and when the degree of amplification of the output signal of the photomultiplier 92 is maintained larger than that of the output signal of the photomultiplier 93, the S/N ratio of the output signal of the adder 30 increases.

In the correction circuit 50, in order to adjust the degrees of amplification as described above, the outputs of the pre-amplifiers 101, 102 and 103 are independently sent to FETs 38a, 38b and 38c via delay circuits 39a 39b and 39c, and an amplification degree weighting circuit 51 is provided. In the weighting circuit 51, dividers 40, 41 and 42 divide the outputs of the pre-amplifiers 101, 102 and 103 by the output of the adder 30, and calculate the contribution ratios of the pre-amplifiers 101, 102 and 103 to the whole signal. Voltages corresponding to the contribution ratios and the output 36 of the adder 35 for eliminating deterioration in sensitivity at the boundary P1 between the photomultipliers 91 and 92 and at the boundary P2 between the photomultipliers 92 and 93 are respectively added in adders 43, 44 and 45 and are then sent to gates of the FETs 38a, 38b and 38c. Accordingly, when the laser beam 2 impinges upon the stimulable phosphor sheet 10 at a position standing face to face with the photomultiplier 91 and the contribution ratio of the output of the photomultiplier 91 is higher than those of the outputs of the photomultiplier 92 and 93, the gate voltage of the FET 38a becomes higher than the gate voltages of the FETs 38b and 38c, and the resistance across the source and the drain of the FET 38a decreases. As a result, the degree of amplification of the output signal of the photomultiplier 91 becomes higher than those of the output signals of the photomultipliers 92 and 93. In the same manner, the degree of amplification of the output signal of the photomultiplier 92 becomes higher than that of the output signal of the photomultiplier 93. By weighting the degrees of amplification of the outputs signals of the photomultipliers 91, 92 and 93 as described above, the S/N ratio of the output signal of the correction circuit 50 is improved.

In the aforesaid embodiments, the photomultipliers 91, 92 and 93 are directly contacted with the light output face 8b of the elongated light guide member 8.

Figure 5:
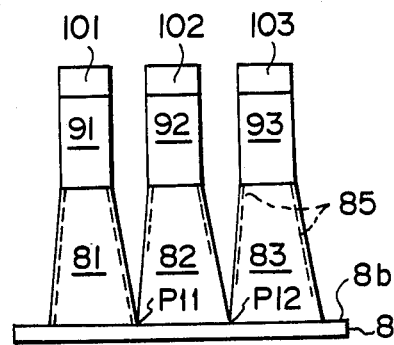
FIG. 5 is a schematic view showing an example of the photoelectric read-out means in the apparatus of FIG. 2.

However, as shown in FIG. 5, it is also possible to optically associate the light output face 8b of the elongated light guide member 8 with the photomultipliers 91, 92 and 93 via light guide member pieces 81, 82 and 83. In this case, it becomes possible to minimize deterioration in sensitivity at the boundary P11 between the light guide member pieces 81 and 82 and at the boundary P12 between the light guide member pieces 82 and 83. Also, when the side end faces of the light guide member pieces 81, 82 and 83 are formed as mirror faces 85, 85, ..., light loss at the light guide member piece 81, 82 and 83 is minimized.

Instead of using the analog circuit as shown in FIG. 3, it is also possible to use a digital circuit for eliminating deterioration in sensitivity. Also, the number of the photomultipliers associated with the light guide member is not limited to three, and four or more photomultipliers may be used. In the correction circuits of FIGS. 3 and 4, the sensitivity correction points (timing) are adjusted each time the scanning by the laser beam 2 is carried out. However, it is also possible to adjust the sensitivity correction points in advance by defining them by distances from an end portion of scanning in the main scanning direction.

The radiation image read-out apparatus of the present invention is provided with two or more photodetectors positioned as the photoelectric read-out means 7 side by side along the scanning line 2a as described above, and if further provided with a control means for controlling the turning on and off of the photodetectors in accordance with the movement of the scanning point so that at least the photodetector farthest from the scanning point is turned off, and at least the photodetector nearest the scanning point is turned on.

Figure 1:
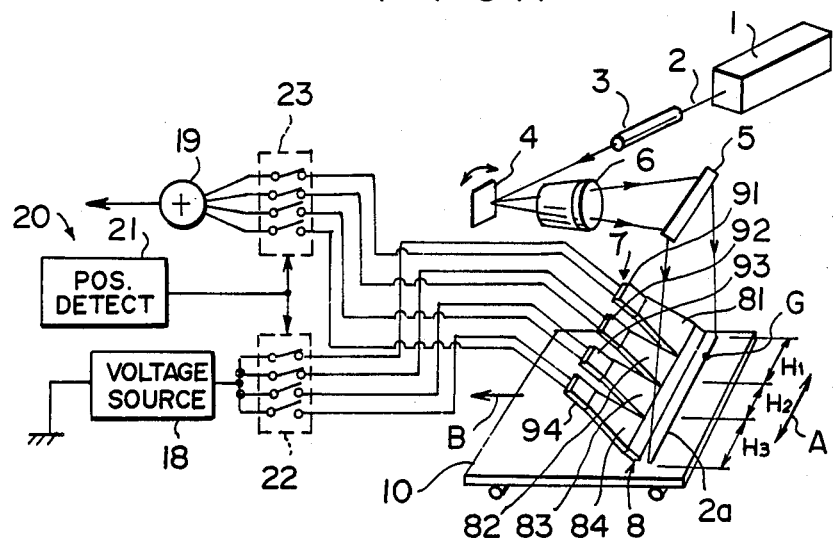
FIG. 1 is a schematic view showing an embodiment of the radiation image read-out apparatus in accordance with the present invention.

An embodiment of the radiation image read-out apparatus in accordance with the present invention will hereinbelow be described with reference to FIG. 1. By way of example, FIG. 1 shows the case where four photodetectors are provided. In FIG. 1, similar elements are numbered with the same reference numerals with respect to FIGS. 2 to 6.

In FIG. 1, a photoelectric read-out means 7 comprises an elongated plate-shaped light guide member 8 positioned to face a scanning line 2a, light guide member pieces 81, 82, 83 and 84 connected to the light guide member 8, and photomultipliers 91, 92, 93 and 94 connected as photodetectors to the light guide member pieces. The photomultipliers 91, 92, 93 and 94 are connected with a high voltage source 18, and the outputs thereof are sent to an adder 19. A control means 20 comprises a scanning position detection means 21 for detecting the position of a scanning point G on the scanning line 2a, and one or the other (whichever is provided) of an input side switching control means 22 for turning on and off the photomultipliers 91, 92, 93 and 94 on the basis of the output of the scanning position detection means 21 (i.e. the switching control means positioned on the circuit system connecting the photomultipliers 91, 92, 93 and 94 with the high voltage source 18 for applying a high voltage thereto) and an output side switching control means 23 positioned on the circuit system connecting the photomultipliers 91, 92, 93 and 94 with the adder 19 for adding their outputs.

The scanning position detection means 21 may be of the type detecting the position of the scanning point on the basis of a drive signal of a galvanometer mirror 4 used as a light deflection means, or of the type detecting the position of the scanning point by constituting a plane reflection mirror 5 by a semi-transparent mirror, making the stimulating rays passing through the semi-transparent mirror impinge upon a grid (not shown), and detecting a light pulse passing through the grid by a photodetector (not shown).

As described above, either the input side switching control means 22 or the output side switching control means 23 is provided. The input side switching control means 22 controls turning on and off of the high voltage to the photomultipliers 91, 92, 93 and 94 based on the output of the scanning position detection means 21, so that some of the photomultipliers 91, 92, 93 and 94 are activated and outputs of the other thereof are made zero. The output side switching control means 23 controls turning on and off of the outputs of the photomultipliers 91, 92, 93 and 94 on the basis of the output of the scanning position detection means 21, so that the outputs of some of the photomultipliers 91, 92, 93 and 94 are sent to the adder 19 and the outputs of the other thereof are not sent to the adder 19.

The on-off control of the photomultipliers 91, 92, 93 and 94 (control of turning on and off of the applied voltage, or of the outputs) is conducted based on the movement of the scanning point G so that at least the photomultiplier farthest from the scanning point G is turned off and at least the photomultiplier nearest the scanning point G is turned on.

Stated differently, the on-off control is conducted so that the photomultipliers positioned within a predetermined range spaced by a predetermined distance from the scanning point G and including the photomultiplier farthest from the scanning point G are turned off, and the other photomultipliers within a predetermined range in the vicinity of the scanning point G and including the photomultiplier nearest the scanning point G are turned on.

Specifically, when four photomultipliers are provided and the scanning point G is within the range H11 as shown, the photomultipliers 91 and 92 are turned on, and the other photomultipliers 93 and 94 are turned off. When the scanning point G is within the range H2 between the middle point of the light guide member piece 82 and the middle point of the light guide member piece 83, the photomultipliers 92 and 93 are turned on, and the other photomultipliers 91 and 94 are turned off. When the scanning point G is within the range H3, the photomultipliers 93 and 94 are turned on, and the other photomultipliers 91 and 92 are turned off.

Basically, the aforesaid control is conducted based on the idea as described below. Namely, almost all of the light emitted by the scanning point G in proportion to the stored radiation energy is detected by the photomultipliers positioned within the predetermined range in the vicinity of the scanning point G, and the photomultipliers within the range spaced by some distance from the scanning point G do not detect it. Therefore, the purpose of image read-out may be achieved sufficiently when only the photomultipliers within the range capable of detecting the significant amount of the light emitted by the scanning point G at any given instant are turned on. By turning off the photomultipliers outside of said range, it becomes possible to eliminate detection of the instantaneous light emission after-glow emitted by the area outside of said range and to minimize the amount of the instantaneous light emission after-glow detected which constitutes noise. The on-off control of the photomultipliers in accordance with the movement of the scanning point G may be conducted in various manners suitable for the read-out purpose, the number of the photodetectors or the like. For example, instead of always turning on two photodetectors as described above, three photodetectors may always be turned on when more photodetectors are positioned side by side.

In the case where two photodetectors are positioned side by side, the read-out control error becomes large when the scanning point is near the intermediate point between the photodetectors and one of the photodetectors is turned on and the other thereof is turned off. Therefore, three or more photodetectors should preferably be provided.

As shown in FIG. 2, the output of the adder 19 may be sent to the correction circuit 13 as shown in FIG. 3 or 4 and then to the image processing circuit 14, whereafter it can be used to reproduce a visible image on a CRT 15 or be stored in a magnetic tape 16.

I claim:
1. In a radiation image read-out apparatus provided with a stimulating ray source for emitting stimulating rays, a light deflection means for deflecting the stimulating rays to produce a moving scanning point for scanning a stimulable phosphor sheet carrying a radiation image stored therein by said stimulating rays which cause said stimulable phosphor sheet to emit light in proportion to the stored radiation energy, and a photoelectric read-out means for detecting the emitted light, the improvement comprising:
    (i) two or more photodetectors constituting said photoelectric read-out means and positioned side by side along the scanning line, and
    (ii) a control means for controlling the turning on and off of said photodetectors in accordance with the position of said scanning point so that at least the photodetector farthest from the scanning point at any given instant is turned off, and at least the photodetector nearest the scanning point is turned on, and wherein said control means comprises a scanning position detection means for detecting the position of said scanning point, and a switching control means positioned on a voltage input side of said photodetectors for turning on and off said photodetectors on the basis of the output of the scanning position detection means such that the amount of instantaneous light emission after-glow detected together with the light emitted by a stimulable phosphor sheet in proportion to the stored radiation energy during the readout from the stimulable phosphor sheet is minimized.

2. An apparatus as defined in claim 1 wherein said photoelectric read-out means comprises an elongated light guide member, two or more light guide member pieces connected to said light guide member, and said two or more photodetectors connected respectively to said light guide member pieces.

3. In a radiation image read-out apparatus provided with a stimulating ray source for emitting stimulating rays, a light deflection means for deflecting the stimulating rays to produce a moving scanning point for scanning a stimulable phosphor sheet carrying a radiation image stored therein by said stimulating rays which cause said stimulable phosphor sheet to emit light in proportion to the stored radiation energy, and a photoelectric read-out means for detecting the emitted light, the improvement comprising:
    (i) two or more photodetectors constituting said photoelectric read-out means and positioned side by side along the scanning line, and
    (ii) a control means for controlling the turning on and off of said photodetectors in accordance with the position of said scanning point so that at least the photodetector farthest from the scanning point at any given instant is turned off, and at least the photodetector nearest the scanning point is turned on, and wherein said control means comprises a scanning position detection means for detecting the position of said scanning point, and a switching control means positioned on the output sides of said photodetectors for turning on and off the outputs of said photodetectors on the basis of the output of said scanning position detection means, whereby the amount of instantaneous light emission afterglow detected together with the light emitted by a stimulable phosphor sheet in proportion to the stored radiation and energy during the readout from the stimulable phosphor sheet is minimized and a noise-free image signal is generated which is highly useful for reproducing a visible radiation image.

* * * * *